United States Patent [19]
Maeda

[11] Patent Number: 5,553,048
[45] Date of Patent: Sep. 3, 1996

[54] MEMORY CONTROL DEVICE AND REPRODUCING AND/OR RECORDING APPARATUS

[75] Inventor: Yasuaki Maeda, Kanagawa, Japan

[73] Assignee: Sony Corporation, Tokyo, Japan

[21] Appl. No.: 230,115

[22] Filed: Apr. 20, 1994

[30] Foreign Application Priority Data

Apr. 23, 1993 [JP] Japan .................. 5-119304

[51] Int. Cl.$^6$ .................................. G11B 7/00
[52] U.S. Cl. .................. 369/60; 369/124; 369/48
[58] Field of Search .................. 369/48, 47, 124, 369/54, 58, 59, 60, 32

[56] References Cited

U.S. PATENT DOCUMENTS

| | | | |
|---|---|---|---|
| 4,692,859 | 9/1987 | Ott | 364/238.6 |
| 5,111,444 | 5/1992 | Fukushima et al. | 369/58 |
| 5,123,088 | 6/1992 | Kasahara et al. | 395/159 |
| 5,218,450 | 6/1993 | Nagai et al. | 369/48 |
| 5,253,337 | 10/1993 | Hirose | 395/161 |
| 5,295,124 | 3/1994 | Shirako | 369/48 |
| 5,325,347 | 6/1994 | Sako | 369/48 |
| 5,434,991 | 7/1995 | Maeda et al. | 369/59 |

FOREIGN PATENT DOCUMENTS

| | | |
|---|---|---|
| 0275972A1 | 7/1988 | European Pat. Off. . |
| 0281415A2 | 9/1988 | European Pat. Off. . |
| 0378449A2 | 7/1990 | European Pat. Off. . |
| 0399853A2 | 11/1990 | European Pat. Off. . |
| 0448378 | 9/1991 | European Pat. Off. . |
| 0465053 | 1/1992 | European Pat. Off. . |
| 0472343 | 2/1992 | European Pat. Off. . |
| 0506471 | 9/1992 | European Pat. Off. . |
| 0535832 | 4/1993 | European Pat. Off. . |
| 0540164 | 5/1993 | European Pat. Off. . |
| 0543446A1 | 5/1993 | European Pat. Off. . |
| 0540164A1 | 5/1993 | European Pat. Off. . |
| 0586189A2 | 3/1994 | European Pat. Off. . |
| 0596417 | 5/1994 | European Pat. Off. . |
| 0621596A2 | 10/1994 | European Pat. Off. . |
| 5-89643 | 4/1993 | Japan . |
| 5-89602 | 4/1993 | Japan .................. 369/48 |

OTHER PUBLICATIONS

Patent Abstracts of Japan, vol. 17, No. 616 (P–1643), Nov. 12, 1993 JP–A–05189933 (Sony Corporation), Jul. 30, 1993.

Electronics & Wireless World, Oct. 1986, No. 1608, "IBM's PC Filing System," F. Stubbs, Ph.D.

*Primary Examiner*—Nabil Z. Hindi
*Attorney, Agent, or Firm*—Limbach & Limbach L.L.P.

[57] ABSTRACT

In a memory control device for controlling the write-in/read-out operation for a memory of a recording/reproducing apparatus, a sector data storing and an additive area are set in each sector-based data storing area in the memory. A prescribed data is stored in the additive area associated with the sector-based data stored in the sector data storing area. The access addresses for the additive area are generated on the bits of the sector count value when the sector data write-in or read-out is carried out in the memory. The access addresses are calculated by the memory control device.

14 Claims, 12 Drawing Sheets

[FIG. 3]
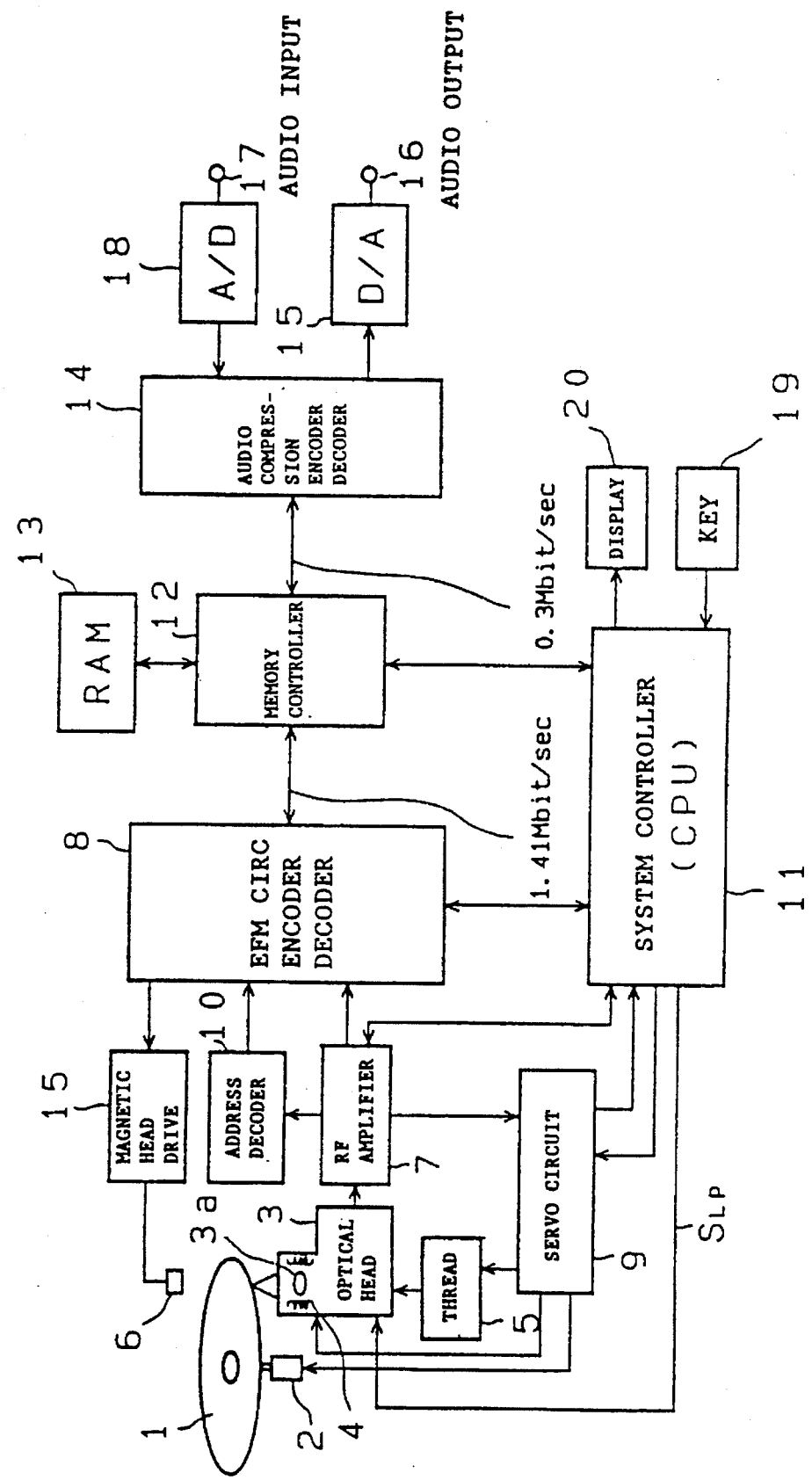

FIG. 4

| | | 16bit | | | 16bit | | |
|---|---|---|---|---|---|---|---|
| | MSB — LSB | MSB — LSB | MSB — LSB | MSB — LSB | |
| SYNC HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000000 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disc type | Rec power | First TNO | Last TNO | 7 |
| | READ-OUT START ADDRESS (RO$_A$) | | | Used Sectors | 8 |
| | POWER CALL AREA START ADDRESS (PC$_A$) | | | 00000000 | 9 |
| | U-TOC START ADDRESS (UST$_A$) | | | 00000000 | 10 |
| | RECORDABLE USER AREA START ADDRESS (RST$_A$) | | | 00000000 | 11 |
| CORRESPONDING TABLE INDICATING DATA PORTION | 00000000 | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| MANAGING TABLE PORTION (255 PART TABLES) (01h) | START ADDRESS | | | TRACK MODE | 78 |
| | END ADDRESS | | | 00000000 | 79 |
| (02h) | START ADDRESS | | | TRACK MODE | 80 |
| | END ADDRESS | | | 00000000 | 81 |
| (03h) | START ADDRESS | | | TRACK MODE | 82 |
| | END ADDRESS | | | 00000000 | 83 |
| (FCh) | START ADDRESS | | | TRACK MODE | 580 |
| | END ADDRESS | | | 00000000 | 581 |
| (FDh) | START ADDRESS | | | TRACK MODE | 582 |
| | END ADDRESS | | | 00000000 | 583 |
| (FEh) | START ADDRESS | | | TRACK MODE | 584 |
| | END ADDRESS | | | 00000000 | 585 |
| (FFh) | START ADDRESS | | | TRACK MODE | 586 |
| | END ADDRESS | | | 00000000 | 587 |

P-TOC SECTOR 0

[FIG. 5]

| | 16bit | | 16bit | | |
|---|---|---|---|---|---|
| | MSB        LSB | MSB        LSB | MSB        LSB | MSB        LSB | |
| Sync Header { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| CORRESPONDING TABLE INDICATING DATA PORTION { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGING TABLE PORTION (255 PART TABLES) { (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

[FIG. 6]
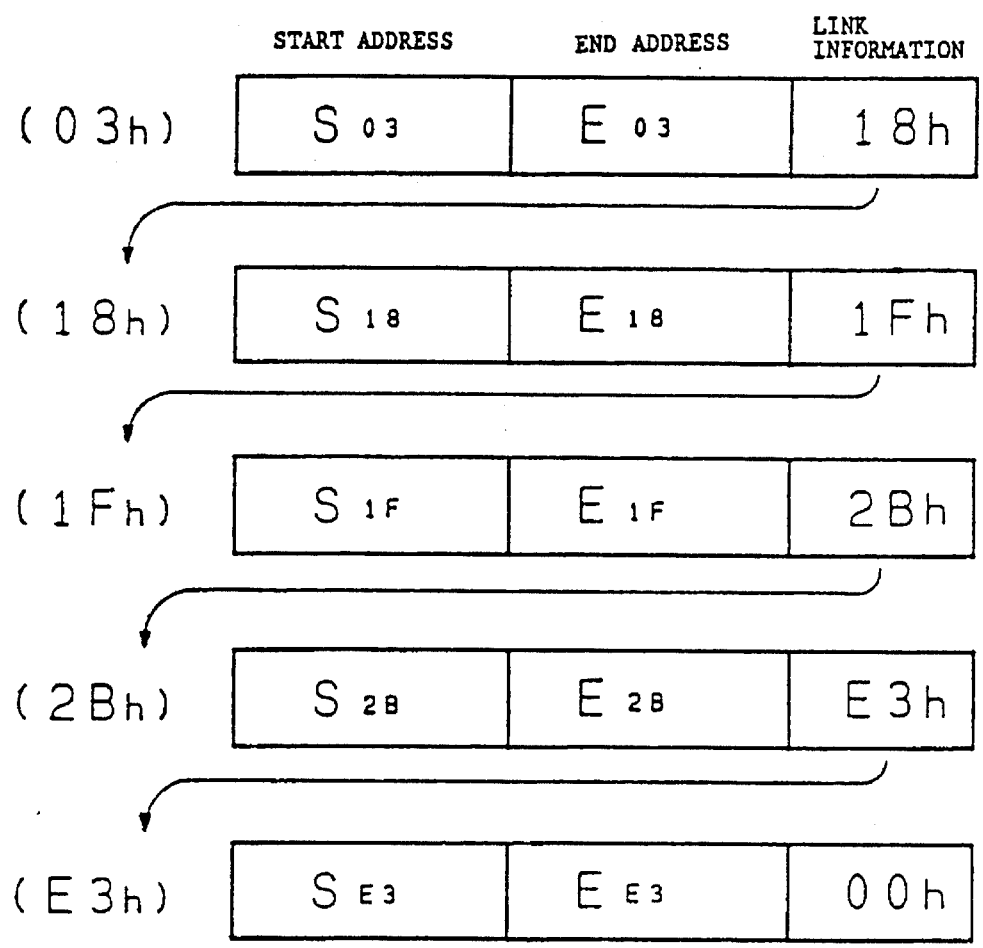

MEMORY CONTROL DEVICE AND REPRODUCING AND/OR RECORDING APPARATUS

BACKGROUND OF THE INVENTION

1. Field of the Invention

This invention relates to a recording apparatus and/or a reproducing apparatus capable of recording and/or reproducing audio data, etc. for a disc-shaped recording medium, for example. More particularly, this invention relates to a memory control device equipped in these kinds of apparatus.

DESCRIPTION OF THE PRIOR ART

There have been known data rewritable magneto-optical discs on which a user can record music data, etc. The shockproof function of these discs can be improved by utilizing a buffer RAM.

In a reproducing operation, audio data read out from a magneto-optical disc is intermittently written into a buffer RAM at a high rate. Then this data is continuously read out from the buffer RAM at low rate while conducting a demodulation processing to obtain audio reproduction signals. In this way, a certain amount of data is accumulated in the buffer RAM at all times. Thus, the audio data can be continuously read out from the buffer RAM even when a track jump occurs due to external vibration or the like and the data read-out operation from the magneto-optical disc is temporarily interrupted, so that the reproduced signals can be output without interruption.

Further, in a recording operation, input data is continuously and temporarily written into the buffer RAM at a low rate. This data is then intermittently read out at a high rate and supplied to a recording head to perform a recording operation on the disc.

A recording track of the magneto-optical disc comprises continuously-formed clusters CL each of which includes a sub data area of 4 sectors and a main data area of 32 sectors as shown in FIG. 1. Each cluster comprises 36 sectors and each sector comprises 2352 bytes.

One cluster serves as a minimum unit for the recording operation. One cluster has the length corresponding to two or three rounds of the disc. An address is recorded for every sector. The sub data area of 4 sectors is used for sub data or as a linking area. TOG data, audio data, etc. are recorded in the main data area of 32 sectors.

The sector is further divided into sound groups. Two sectors are divided into 11 sound groups. The data are recorded in a sound group of 424 bytes while being separated into left and right channels. Each sound group contains audio data whose time corresponds to 11.6 msec. Further, 212 bytes which serve as a data area of Left-channel or Right-channel is called a "sound frame".

When the recording and/or reproducing operation is conducted through the buffer RAM on data which is recorded on the disc having the format described above, the buffer RAM carries out its storage operation on a sector basis. That is, a sector address and a byte address (0 to 2351 byte) in the sector are combined with each other to generate an access address. The write-in and read-out operations are carried out on the basis of this access address.

In magneto-optical systems according to the conventions described above, there is a system controller for controlling the whole processing of the magneto-optical system. It is preferable that various kinds of information for a read-out sector are obtained when the data of the sector is read out from the buffer RAM. For example, due to the data reproducing operation through the buffer RAM, a time lag occurs between the time when the data of a sector is read out from the disc and the time when it is actually reproduced. Thus, it is preferable that information relating to a music play progress time of the sector be read out at the time when the data of the sector is read out from the buffer RAM of the sector.

In addition, it is also very preferable that information such as a track number, track change information, track mode information on identification of stereo/monaural, emphasis, inhibition or permission of copyright link information for front and rear sides in managing information of audio data, error information, etc. can be written in the buffer RAM at the same time when the data of the sector is written into the buffer RAM. It is also preferable that this information be read out at the same time when the data of the sector is read out from the buffer RAM. Hereinafter, these kinds of information which are stored in the buffer RAM along with the sector are referred to as "additive data".

Therefore, when the data of a sector is written into the buffer RAM, the above kinds of additive data are conventionally over-written on data portions which subsequently become unnecessary. These data portions which subsequently become unnecessary include a sync data (921h~92Fh), a mode data (003h), and a sub header (004h~007h) as in shown as FIG. 2 (Note that numerical values affixed with an "h" in the specification are in hexadecimal notation). These kinds of additive data are stored along with an associated sector in the buffer RAM.

However, an address indication is required for the read-out of the additive data, and thus the system controller is required to carry out management of addresses at which the additive data are written and read-out addresses for indicating processing. This increases the processing load of the system controller.

OBJECTS AND SUMMARY OF THE INVENTION

An object of this invention is to reduce the processing load of a system controller by storing additive data for sector data in a buffer RAM and releasing the system controller from the processing load involved in carrying out the address calculation of the additive data.

According to an embodiment of the present invention, a recording and/or reproducing apparatus includes a memory for storing data to be recorded on the medium and/or data which are read out from the medium. The recording and/or reproducing apparatus also includes an additional data generator for generating the additional data. The recording and/or reproducing apparatus also includes a memory controller for arranging reproduced data from the medium and/or data to be recorded on the medium into blocks of data, supplementing the additional data in correspondence with each block of data to produce blocks of supplemented data checking the data area for storing supplemented data on the memory, and controlling the write-in/read-out of the supplemental data in the.

According to another aspect of the present invention there is a memory control device for use in a recording and/or reproducing apparatus having memory means for storing data on a sector basis to be recorded on a recording medium or data which are read out from a recording medium. The memory control device also includes a first write-in counter for counting a number of sectors on the basis of a sector sync signal to obtain an address for a data write-in operation into the memory. The memory control device also includes a first read-out counter for counting a number of sectors on the basis of the sector sync signal to obtain an address for a data read-out operation from the memory. The memory control device also includes a first selector for selecting a count value Ns from among the number of sectors counted respectively by the first write-in counter and the first read-out counter. The memory control device also includes a calculator for calculating the sector address in accordance with the count value Ns. The memory control device also includes a second write-in counter for counting a byte value on the basis of the sector sync signal and byte count signal to obtain a byte address for a data write-in operation into the memory. The memory control device also includes a second read-out counter for counting a byte value on the basis of the sector sync and byte count signal to obtain a byte address for a data read-out operation from the memory. The memory control device also includes an offset byte generator for generating a byte value which is offset corresponding to the byte addresses for the additive data of the sector unit. The memory control device also includes a second selector for selecting a byte address value from among the byte values received from the second write-in counter, the second read-out counter and the offset byte generator. The memory control device also includes an address generator/outputting device for adding the sector address output from the calculator to the byte address value from the second selector to calculate an access address and for outputting the calculated access address to the memory.

BRIEF DESCRIPTION OF THE DRAWINGS

FIG. 3 is a block diagram showing a recording and reproducing apparatus of an embodiment according to the present invention.

FIG. 4 is a schematic view of a P-TOC sector on a disc.

FIG. 5 is a schematic view of an U-TOC sector of a disc.

FIG. 6 is a schematic view of a management mode of the U-TOC on the disc.

DETAILED DESCRIPTION OF THE PREFERRED EMBODIMENTS

Figure 1:
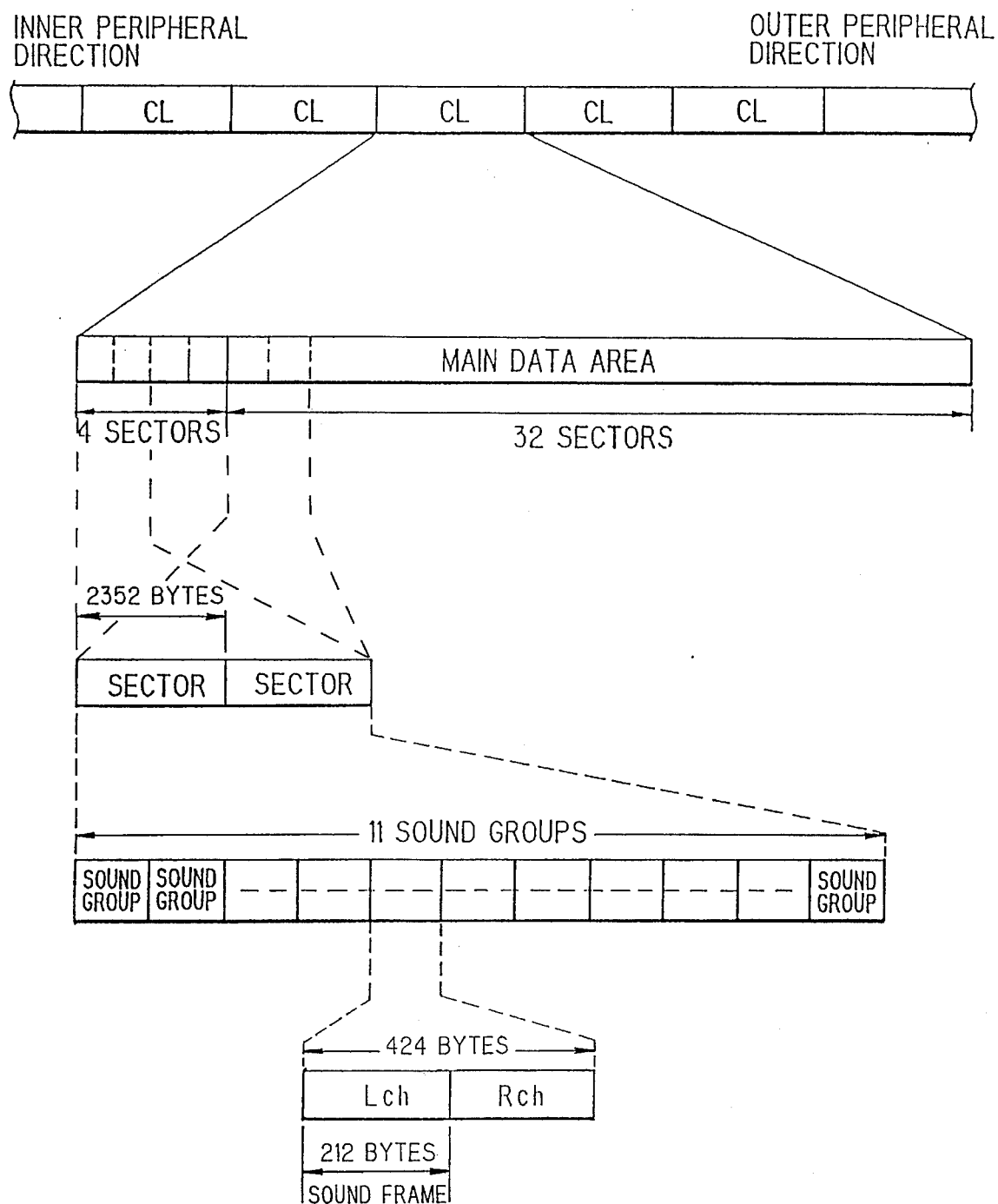
FIG. 1 is a schematic view of a track format on the disc.
Figure 2:
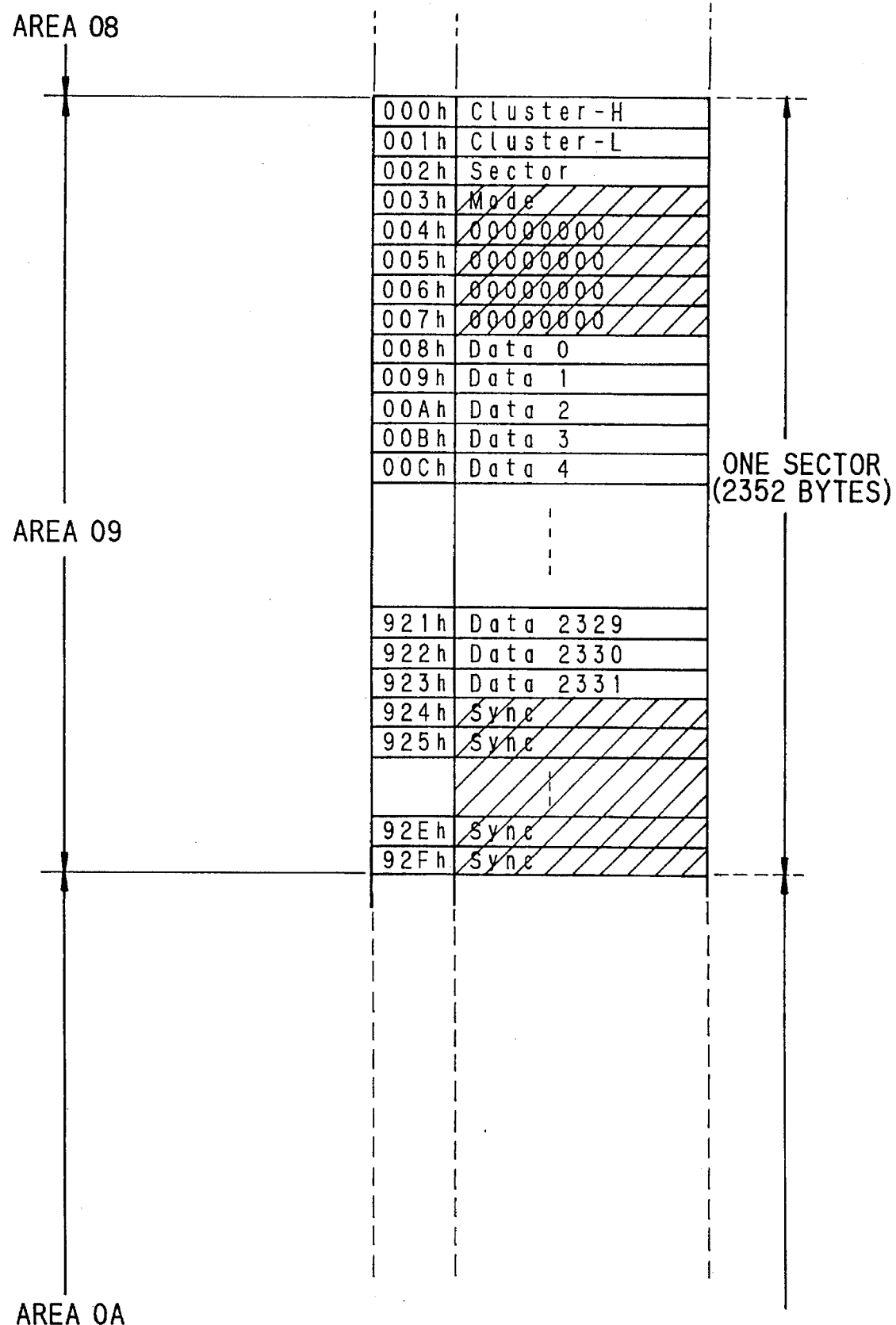
FIG. 2 is a schematic view of a storage area of a buffer RAM in a conventional recording and reproducing apparatus.

Preferred embodiments of a recording and/or reproducing apparatus and a memory control device according to this invention will be described with reference to FIGS. 3 to 12.

These embodiments relate to a recording and/or reproducing apparatus in which a magneto-optical disc is used as a recording medium, and a memory control device is equipped in the recording and/or reproducing apparatus.

FIG. 3 is a block diagram showing a main part of the recording and reproducing apparatus. In FIG. 3, a reference numeral 1 represents a magneto-optical disc on which audio data or the like is recorded. The magneto-optical disc 1 is rotationally driven by a spindle motor 2. A reference numeral 3 represents an optical head for irradiating a laser beam onto the magneto-optical disc I in recording or reproducing operations.

In the recording operation, the optical head 3 outputs a high-level laser beam to heat recording tracks up to the Curie temperature. In the reproducing operation, the optical head 3 outputs a relatively low level laser beam to detect data from reflected light through the magnetic Kerr effect.

Accordingly, the optical head 3 is equipped with a laser diode (not shown) serving as laser output means, an optical system comprising a deflection beam splitter, an objective lens, and a detector for detecting reflected light. The objective lens 3a is supported by a biaxial mechanism 4 to be displaceable in a disc radial direction and in a direction toward and away from the disc (i.e. perpendicular to the major surfaces of the disc).

A reference numeral 6 represents a magnetic head for supplying the magneto-optical disc with magnetic field which is modulated by supplied data. The magnetic head 6 is disposed at a position opposite the optical head 3 with respect to the magneto-optical disc 1. The optical head 3 and the magnetic head 6 are movable in the disc radial direction by a thread mechanism 5.

Information which is detected from the magneto-optical disc 1 by the optical head 3 in the reproducing operation is supplied to an RF amplifier 7. The RF amplifier 7 conducts calculation processing on the supplied information to extract a reproduction RF signal, a tracking error signal, a focus error signal, an absolute position information, an address information, a focus monitor signal, etc. The absolute position information can be recorded as pre-groove (wobbling groove) on the magneto-optical disc 1. The extracted reproduction RF signal is supplied to an encoder and decoder unit 8. The tracking error signal and the focus error signal are supplied to a servo circuit 9. The address information is supplied to an address decoder 10. The absolute position information and the focus monitor signal are supplied to a system controller I 1 comprising a microcomputer.

The servo circuit 9 generates various kinds of servo driving signals on the basis of the supplied tracking error signal and focus error signal, and an access instruction (auto music sensor), a seek instruction, a rotational speed detection information of a spindle motor, etc. which are supplied from the system controller 11. The servo circuit 9 controls the biaxial mechanism 4 and the thread mechanism 5 to perform focus and tracking control. Further, the servo circuit 9 controls the spindle motor 2 to operate at a constant angular velocity (CAV) or constant linear velocity (CLV).

The reproduction RF signal is subjected to a decoding processing such as EFM (eight fourteen modulation) demodulation, CIRC (cross-interleaved Reed-Solomon coding) or the like in the encoder and decoder unit 8. The signal is then temporarily written in a buffer RAM 13 by the memory controller 12. The data read-out operation from the magneto-optical disc 1 by the optical head 3 and the transmission rate of reproduced data in a system which extends from the optical head 3 to the buffer RAM 13 are carried out intermittently at 1.41 Mbit/sec.

The data written in the buffer RAM 13 is read out at such a timing that the transmission rate of the reproduced data is carried out at 0.3 Mbit/sec. The data read from the buffer RAM 13 is supplied to the encoder and decoder unit 14. Thereafter, the data is subjected to a reproduction signal processing such as a decode processing for an audio compression processing, converted to analog signals by a D/A converter 15, and supplied to a prescribed amplifier circuit from a terminal 16 to be output as audio signals, for example, Left (L) and Right (R) audio signals.

The data write-in and read-out for the buffer RAM 13 is carried out using address indication through the control of write-in pointer and read-out pointer by the memory controller 12. The write-in pointer (write-in byte address) is incremented at 1.41 Mbit/sec timing as described above. The read-out pointer (read-out byte address) is incremented at 0.3 Mbit/sec timing. Therefore, the buffer RAM 13 is kept in such a state that some amount of data is accumulated in the buffer RAM 13 due to the difference in bit rate between the write-in and the read-out operations. At the time when full capacity of data is accumulated in the buffer RAM 13, the increment of the write-in pointer is stopped, and the data read-out operation from the magneto-optical disc 1 by the optical head 3 is also stopped. However, the increment of the read-out pointer is continued, and thus the reproduced audio output is not interrupted.

Thereafter, assuming that the read-out operation from the buffer RAM 13 is further continued and the data accumulation amount in the buffer RAM 13 is decreased below a predetermined amount, the increment of the data read-out operation and the increment of the write-in pointer by the optical head 3 are resumed, and the data accumulation into the buffer RAM 13 is resumed.

By outputting the reproduced signal through the buffer RAM 13 in the manner as described above, the reproduced audio output is prevented from being interrupted even when the tracking is deviated due to an external disturbance or the like. By re-adjusting to regain an accurate tracking position before the accumulated data is used up and resuming the data read-out operation, the reproducing operation can be continued with no affect on the reproduced output. That is, shockproof functioning can be remarkably improved.

In FIG. 3, the address information output from the address decoder 10 and sub code data for the control operation are supplied through the encoder and decoder unit 8 to the system controller 11 and used for various kinds of control operations. Further, the system controller 11 is supplied with a lock detection signal of a PLL (phase locked loop) circuit for generating bit clocks for the recording or reproducing operations and a monitor signal for monitoring a lack state of a frame sync signal of the reproduction data (Left and Right channels).

The system controller 11 outputs a laser control signal Slp for controlling the operation of the laser diode of the optical head 3, and it serves to carry out ON/OFF control of the output of the laser diode. At the ON control time, the system controller 11 switches the laser power between the relatively low level output of the reproducing operation and the relatively high level output of the recording operation.

When the recording operation is conducted on the magneto-optical disc 1, the recording signal is supplied as an analog audio signal to the terminal 17. The recording signal is converted to digital data by an A/D converter 18. Then the digital data is supplied to the encoder and decoder unit 14 to be subjected to the audio compression encode processing. The recording data compressed by the encoder and decoder unit 14 is temporarily written in the buffer RAM 13 by the memory controller 12. Then the compression data is read out at a prescribed timing to be transmitted to the encoder and decoder unit 8. In the encoder and decoder unit 8, the data is subjected to encode processing such as CIRC (cross-interleaved Reed-Solomon coding) encode, EFM (eight fourteen modulation) modulation, etc. The recording signal is then supplied to a magnetic head driving circuit 15.

The magnetic head driving circuit 15 supplies the magnetic head 6 with a magnetic head drive signal in accordance with the recording data which has been subjected to the encode processing. That is, an N or S magnetic field is applied to the magneto-optical disc 1 by the magnetic head 6 in accordance with the head drive signal. At this time, the system controller 11 supplies a control signal to the optical head 3 to output a laser beam of recording level power.

A reference numeral 19 represents an operation input unit provided with keys which are manipulated by a user. A reference numeral 20 represents a display unit comprising a liquid crystal display, for example. The operation input unit 19 is provided with a recording key, a reproducing key, a stop key, an AMS (auto music sensor) key, a search key, etc. for the user's manipulation.

When the recording and/or reproducing operation is conducted on the disc 1, managing information recorded on the disc 1, that is, P-TOC (Pre-mastered Table Of Contents) and U-TOC (User Table Of Contents) are read out, and in accordance with the managing information, the system controller 11 identifies the addresses of segments to be recorded on the disc 1 and the addresses of segments to be reproduced. This managing information is held in the buffer RAM 13. Therefore, the buffer RAM 13 is divided into a buffer area for the recording data and/or reproducing data, and an area for the managing information.

The system controller 11 executes the reproducing operation for the innermost peripheral side of the disc having the managing information recorded thereon at the time when the disc 1 is installed. In this way, the managing information is read out and stored into the buffer RAM 13, whereby the managing information can be referred to during the recording and/or reproducing operations.

The U-TOC is edited and rewritten in accordance with the recording, erasing or overwriting operation of data. The system controller 11 conducts this edit processing on the U-TOC information stored in the buffer RAM 13 every recording, erasing or overwriting operation. Also, through the above rewriting operation, the U-TOC area on the disc 1 can be rewritten at a prescribed timing.

The audio data sector which is recorded in a sector data format on the disc 1, and the P-TOC sector and the U-TOC sector for managing the recording or reproducing operation of the audio data will now be described. The P-TOC information is used for area indication for recordable areas on the disc and management area for the U-TOC area, etc. When the disc 1 comprises a pre-mastered disc which is an optical disc exclusively used for reproduction, audio data which is fixedly recorded (like ROM) can be managed using only the P-TOC. The format of the P-TOC is shown in FIG. 4. FIG. 4 shows one segment (sector 0) for P-TOC information which is repetitively recorded in an area used for P-TOC. For example, the P-TOC can be recorded as a ROM area at the innermost peripheral side of the disc. Sectors from a sector 0 to a sector 4 are provided for the P-TOC, although sectors 1 to 4 are optional.

The data area for one sector of the P-TOC is 2352 bytes (=4 bytes×588). At the head position of the data area is provided a header with a sync pattern of one byte data for all "0" or all "1", and addresses representing a cluster address and a sector address, etc., thereby indicating the P-TOC area. Subsequently to the header, an identification ID of ASCII code corresponding to the letters "MINI" is added at a predetermined address position. Also recorded subsequently are a disc type, an audio recording level, the number of a first recorded program (First TNO: first track number), the number of a last recorded program (Last TNO: last track number), a read-out start address $RO_A$, a power calibration area start address $PC_A$, a start address $UST_A$ of U-TOC (data area of U-TOC sector 0 of FIG. 5 as described later), a start address $RST_A$ for a recordable area, etc.

Further, there is provided a corresponding table indicating data portion having table pointers (P-TNO1 to P-TNO255) for respectively pointing to part tables in a managing table portion (which will be described later). Further, in an area subsequent to the corresponding table indicating data portion is provided a managing table portion which is equipped with 255 part tables of (01h) to (FFh) in correspondence with the table pointers (P-TNO1 to P-TNO255) in the corresponding table indicating data portion (Note that numerical values affixed with "h" in the specification represent hexadecimal notation). As shown in FIG. 5, each of the part tables is designed to include a start address serving as a starting point for a segment, an end address serving as an end point for the segment, and mode information (track mode) for the segment (track).

The mode information for the track in each part table indicates whether the segment is set to an over-write inhibition or data copy inhibition mode, information as to whether it is audio information, an identification information of monaural/stereo, etc.

The segment content of each of the part tables from (01h) to (FFh) in the managing table portion is indicated by each of the table pointers (P-TNO1 to P-TNO255) of the corresponding table indicating data portion. That is, for the first audio data (the first program), a part table (for example (01h)) will be indicated by a table pointer (for example P-TNO1). A numerical value is used as a table pointer, but this numerical value must be put through a predetermined calculation in order to determine the actual byte position in the P-TOC sector. In this case, the start address of the part table (01h) becomes a start address for the recording position of the audio data of the first program, and similarly the end address becomes an end address for the recording position of the audio data of the first program. Further, the track mode information becomes information for the first program.

Likewise, for a second program, a start address, an end address and a track mode information for the recording position of the second program are recorded in the part table for example (02h) as indicated by the table pointer P-TNO2. Likewise, table pointers up to P-TNO255 are provided, and the programs until a 255th program can be managed on the basis of the P-TOC. By forming the P-TOC sector 0 as described above, a predetermined program can be accessed and reproduced, for example.

For a recordable and/or reproducible magneto-optical disc, no pre-mastered audio data area exists, so that the corresponding table indicating data portion and the managing table portion of the P-TOC are not used (these are managed by U-TOC as described later), and thus all the bytes are set to "00h". However, for a hybrid type of disc having both of a ROM area and a magneto-optical area on which audio data, etc. are recorded, the audio data in the ROM area is managed using the corresponding table indicating data portion and the managing table portion.

The U-TOC will now be described. FIG. 5 shows the format of one sector of the U-TOC. The U-TOC is used as a data area for managing the recording of audio data through a user's audio-recording and for managing information on recordable areas (free areas) on which audio data can be recorded. The format from a sector 0 to a sector 4 is also provided for the U-TOC, although the sectors 1 to 4 are optional. For example whet/a program is recorded on the disc 1, the system controller 11 searches a free area on the disc on the basis of the U-TOC, and records the audio data of the program on the searched free area. Further, in the reproducing operation, the system controller 11 identifies an area in which an audio data to be reproduced is recorded, and accesses the area to perform the reproducing operation.

Like the P-TOC, the sector (sector 0) of the U-TOC as shown in FIG. 5 is first provided with a header, and subsequently with data of a maker code, a model code, the track number of a first program (First TNO), the track number of a last program (Last TNO), a sector use status, a disc serial number, a disc ID (identification code), etc. at predetermined address positions, respectively. Further, the U-TOC is provided with an area on which various kinds of table pointers (P-DFA, P-EMPTY, P-FRA, P-TNO1 to P-TNO255) are recorded as the corresponding table indicating data portion. The various kinds of table pointers are affected by the user's audio recording. The table pointers serve to indicate various types of areas in the managing table portion (which will be described later).

Further, 255 part tables from (01h) to (FFh) are provided as the managing table portion. It is this set of part tables which may be indicated with the table pointers (such as D-DFA, P-FRA, P-TNO 1 to P-TNO255) of the corresponding table indicating data portion. As shown in FIG. 4, each part table contains a start address serving as a starting point for a segment, an end address serving as an end point for the segment and mode information (track mode) for the segment (this is similar to the P-TOC sector 0). Further, for the U-TOC sector 0, there may occur a segment indicated in each part table which is linked to another segment. The link information is recorded in sector 0. By linking part tables, discontinuous segments on the disc (corresponding to start and end addresses of the linked part tables) can thereby be linked for data management purposes.

In this type of recording and reproducing apparatus, even when an audio data is physically discontinuously recorded, that is, it is recorded over plural segments, the reproducing operation is continuous while access between the segments is carried out. In this way, the reproducing operation can be carried out without interruption. Note that the term "segment" means a track portion in which physically continuous data are recorded. With respect to a program which is recorded through user's audio-recording, for the purpose of effective use of recordable areas, the program may be divided and recorded over plural, discrete segments. Therefore, the link information is necessary to link the plural segments containing the program. The link information is indicated by a numerical value with which a byte position in the U-TOC sector 0 is obtained through a predetermined calculation processing. Ordinarily, programs which are permanently pre-recorded are not subjected to segment division, and the link information thereof is set to "(00h)" in the P-TOC sector 0 as shown in FIG. 4.

In other words, in the managing table portion of the U-TOC sector 0, one part table represents one segment, and for an audio data comprising three linked segments, the positions of these segments are managed by the three part tables which are linked to each other with the link information.

The segment contents of the respective part tables from (01h) to (FFh) in the managing table portion of the U-TOC sector 0 are represented as follows by the table pointers P-DFA: pointer for defective area, P-EMPTY: pointer for empty slot, P-FRA: pointer for free area, and table pointers P-TNO1 to P-TNO255 in the corresponding table indicating data portion.

The table pointer P-DFA is provided for indication of a defective area on the magneto-optical disc 1, and indicates a part table or a head part table of plural part tables indicating a track portion (i.e. a segment) is defective due to, for instance, a scratch. That is, when any defective segment exists, any one of (01h) to (FFh) is recorded in the table pointer P-DFA, and the defective segment is indicated with start and end addresses in the corresponding part table. Further, when a second defective segment exists, a part table for the second defective segment is indicated by the link information in the part table for the first defective segment. The defective segment is indicated in this linked part table. Still further, when no other defective segments exist, the link information is set to "(00h)", and no subsequent linkage is indicated.

The table pointer P-EMPTY indicates an unused part table or a head part table of plural unused part tables. When any unused part table exists, one of these unused part tables (between 01h and FFh inclusive) is recorded as the table pointer P-EMPTY. When plural unused part tables exist, the part tables are successively indicated from the part table indicated by the table pointer P-EMPTY on the basis of the link information. All of the unused part tables are linked with one another in the managing table portion.

Assume, for example, a U-TOC in which all the part tables are not used. Accordingly, for example, a part table (01h) is indicated by the table pointer P-EMPTY, then a part table (02h) is subsequently indicated with the link information of the part table (01h), and then a part table (03h) is subsequently indicated with the link information of the part table (02h). This linking operation is repeated until the linkage to the part table (FFh) is carried out. In this case, the link information of the part table (FFh) is set to "(00h)" which represents no subsequent linkage.

The table pointer P-FRA represents a free area (containing an erased area) in which data can be written on the magneto-optical disc 1, and indicates a part table or a head part table of plural part tables in which a track portion (i.e., a segment) serving as a free area is indicated. That is, when any free area exists, a part table (between 01 h and FFh inclusive) is indicated by the table pointer P-FRA. A segment serving as a free area is indicated with its start and end addresses in this part table. Further, when a plurality of segments as described above exist, then plural part tables indicating the free areas will also exist. The part tables are successively indicated on the basis of the link information until the part table whose link information is set to "(00h)".

FIG. 6 schematically shows an example of the management state of segments serving as free areas indicated by part tables. When each of part tables (03h)(18h)(1Fh)(2Bh)(E3h) indicating discrete segments serve as free areas, as shown in FIG. 6, this management state is effected by linkage of the part tables (03h)(18h)(1Fh) (2Bh)(E3h). The defective areas and the unused part tables can also be managed in a way similar to that shown in FIG. 6.

The table pointers P-TNO1 to P-TNO255 represent the audio data for programs which are recorded on the magneto-optical disc 1 by the user. For example, the table pointer P-TNO1 indicates a part table indicating a segment or a head segment of a series (in time order) of plural segments in which data of a first program is recorded. For example, when a first program is recorded on the disc without dividing a track into sections (that is, with one segment), the recording area of the first program is recorded with the start and end addresses of a part table which is indicated by the table pointer P-TNO1.

Further, when a second program is divided and recorded on discrete, plural segments of the disc, the respective segments indicating the recording position of the program are successively indicated in time order. That is, on the basis of the part table indicated by the table pointer P-TNO2, the other part tables are successively indicated by the link information in the time order. The linkage continues through a part table whose link information is set to "(00h)" (this is similar to the convention shown in FIG. 6). As described above, the second program is recorded by successively indicating all of the segments in which the data of the second program is recorded. The continuous audio information (the audio data of the program) can be reproduced from the discrete segments through the access of the optical head 3 and the magnetic head 6 by referring to the U-TOC sector 0, when the second program is reproduced. Also, when the area of the second program is over-written, the recording area can be effectively used by referring the U-TOC sector 0.

As described above, the area management on the disc is carried out by the P-TOC, and the programs of audio data which are recorded in the recordable user area, the free areas, etc. are managed by the U-TOC. The P-TOC and U-TOC information is read into the buffer RAM 13, and it can be referred to by the system controller 11.

Figure 7:
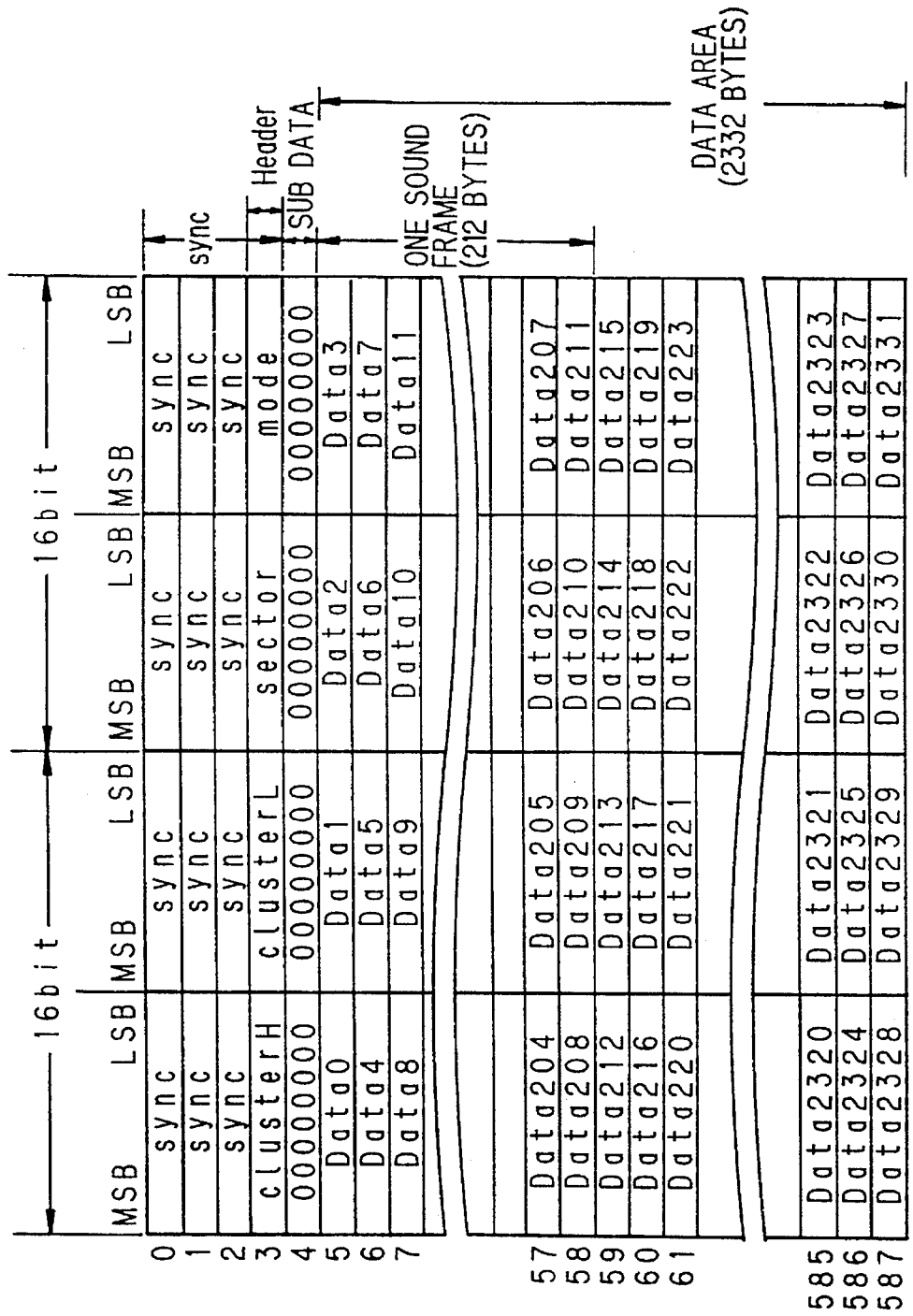
FIG. 7 is a schematic view of a data sector on the disc.

The format of a sector on which an audio data can be recorded is shown in FIG. 7. In the sector (2352 bytes), 12 bytes at the head are set as a sync data, a subsequent 3 bytes are set for a cluster address and a sector address and a further subsequent 1 byte is set as a mode. These 16 bytes are used as a header.

Subsequently to the header, 4 bytes are set as a sub header. Bytes subsequent to the sub header, that is, 2332 bytes from a 21st byte to a 2352nd byte of the sector are used as a data area (Data 0 to Data 2331). In the data area of 2332 bytes are recorded 11 units of sound frames of 212 bytes (see FIG. 1).

Figure 8:
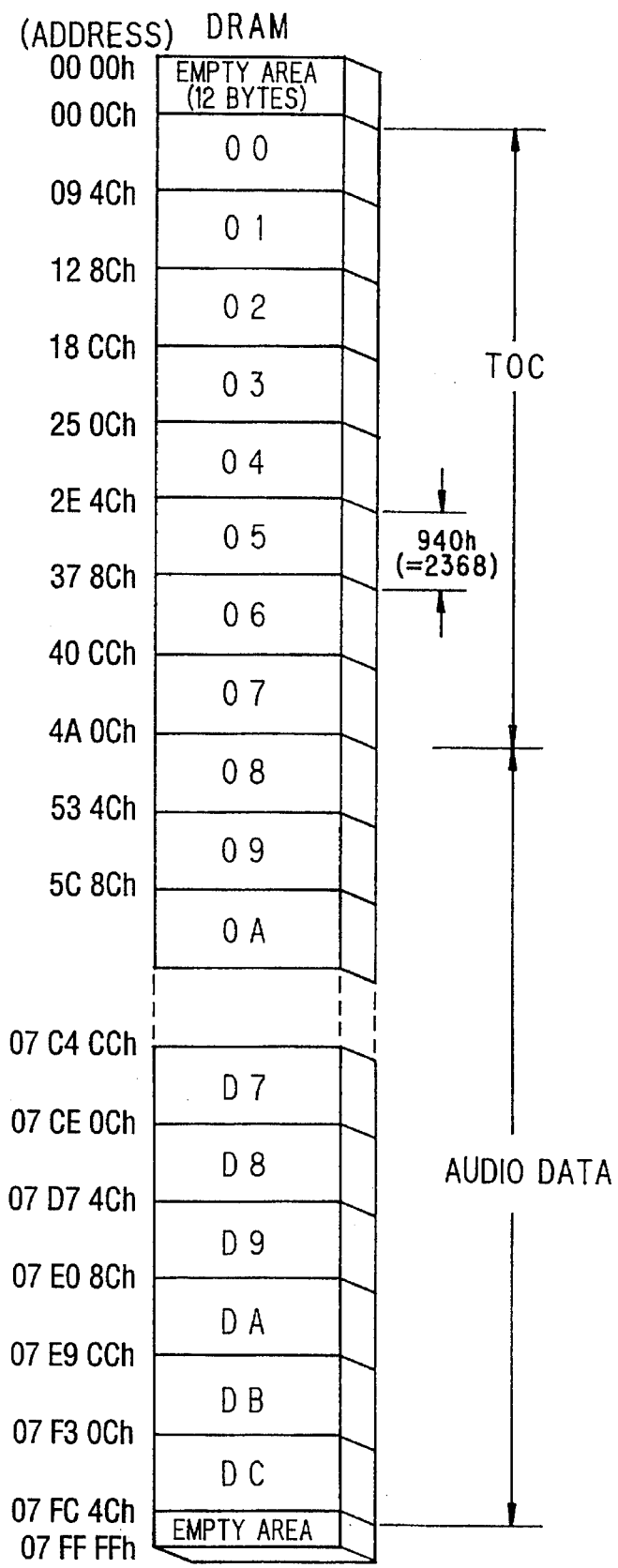
FIG. 8 is a schematic view of a storage area of a buffer RAM.

In order to store these sectors (TOC sector and data sector), the buffer RAM 13, shown in FIG. 8, is used. The storage capacity of the buffer RAM 13 is set to 4 Mbits so that TOC information of 8 sectors can be stored. 12 bytes at the head (address 0000h to 000Ch) are used for an empty area. The subsequent 18933 bytes of addresses 000Ch to 4AOBh are used for TOC information. That is, eight areas from area 00 to area 07 hold the stored TOC sectors. Each area comprises 2368 bytes, and thus in addition to data of one sector of 2352 bytes (see FIG. 4, FIG. 5), additive data of 16 bytes is also storable in each of these areas.

The addresses 4AOCh to 07FC4Bh are used for audio data, that is, an area 08 to an area DC (each area having 2368 bytes) are used for accumulation and read-out of audio data sectors, thereby realizing the shockproof function as described above. Each area comprises 2368 bytes, and thus in addition to the data of one sector of 2352 bytes (see FIG. 7), additive data of 16 bytes can be stored in each of these areas.

The addresses 07FC4Ch to 07FFFFh are used for an empty area. Each of 000Ch to 07F30Ch which is indicated as the head address of each of the areas 00 to DC is calculated on the basis of a count value of a sector serving as a target for write-in/read-out. That is, representing a sector count value by Ns, the sector address is equal to 940h×Ns+0Ch. "0Ch" is an offset of the empty area at the head. Accordingly, for example, the head address for the area 08 is calculated by 940h×08h+0Ch=4A0Ch.

Figure 9:
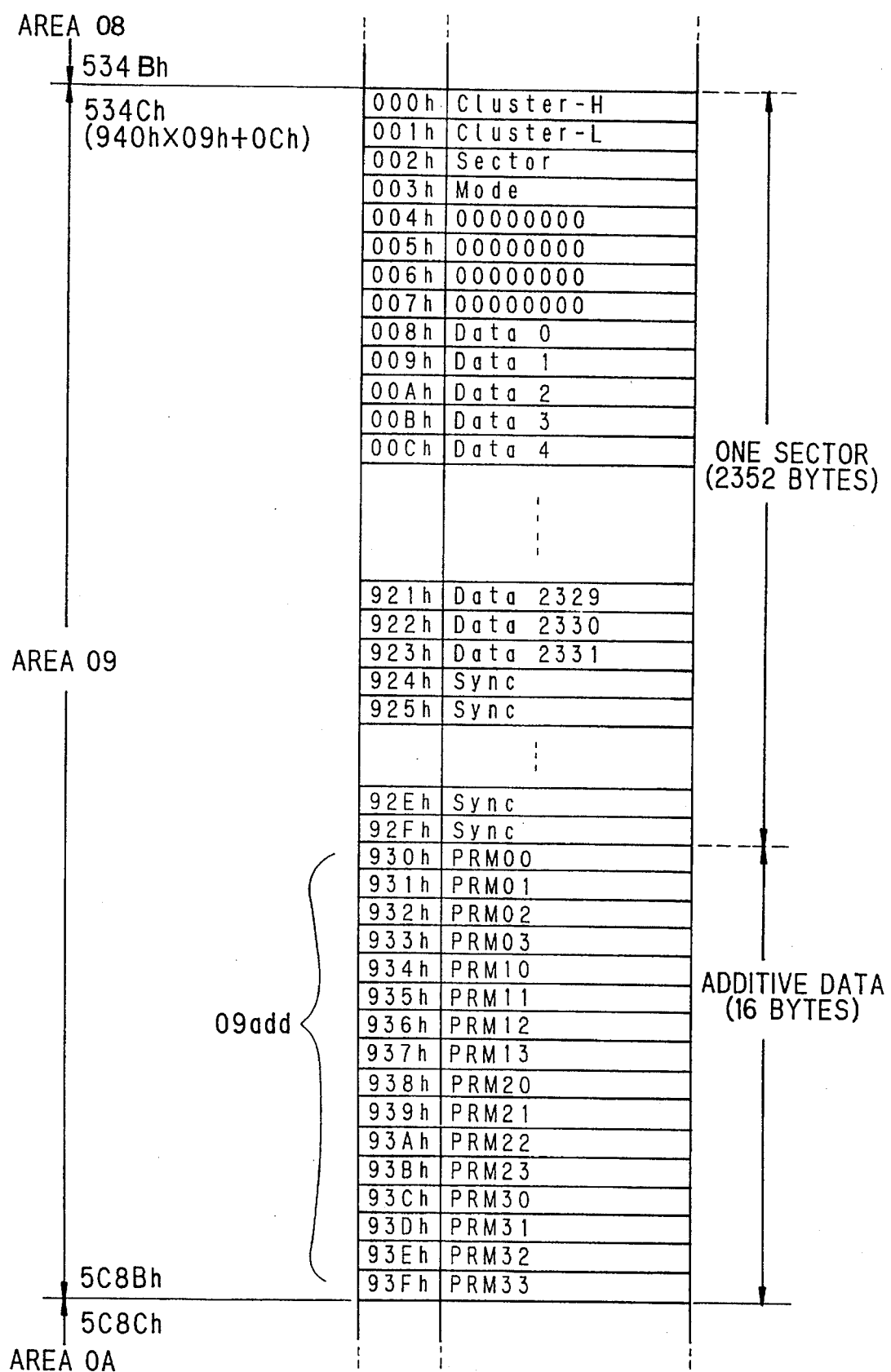
FIG. 9 is a schematic view of a storage area of a buffer RAM.

The inner construction of each area of 2368 bytes, for example, the area 09 is shown in FIG. 9. In the area 09 is stored audio data, that is, a sector like that shown in FIG. 7. This area 09 has the head address at 534Ch, and 2368 bytes from the head address to the address 5C5Bh (000h to 93Fh) are used as shown in FIG. 9.

That is, since the write-in of the sector is executed in accordance with the sync detection, first the cluster address, the sector address and the mode are stored, the 4 byte sub header is subsequently stored, and then the data of Data0 to Data2331 are successively stored. Thereafter, the sync is written, and one sector (2352) is stored.

However, 16 bytes remain in the area 09 after the sector is stored. These remaining 16 bytes (930h to 93Fh) are used for a storage area of sector parameters (additive area 09add) so that additive data can be stored. The address of each byte is obtained by adding the head address of the area (sector address) to the byte address. For example, the address of Data0 in the area 09 is equal to (940h×09h+0Ch)+008h= 5354h. As described above, the additive areas (00add to DCadd) in which the additive data can be stored with the sector data are set from the area 00 to the area DC (FIG. 8) in the buffer RAM 13. In this way, a track number, a progress time, a track mode, link information, an error information, etc. which are incident to the sector can be held in along with an associated sector. When the sector data is read out, the additive data incident to the sector are also read out to carry out the management of various kinds of operations.

Figure 10:
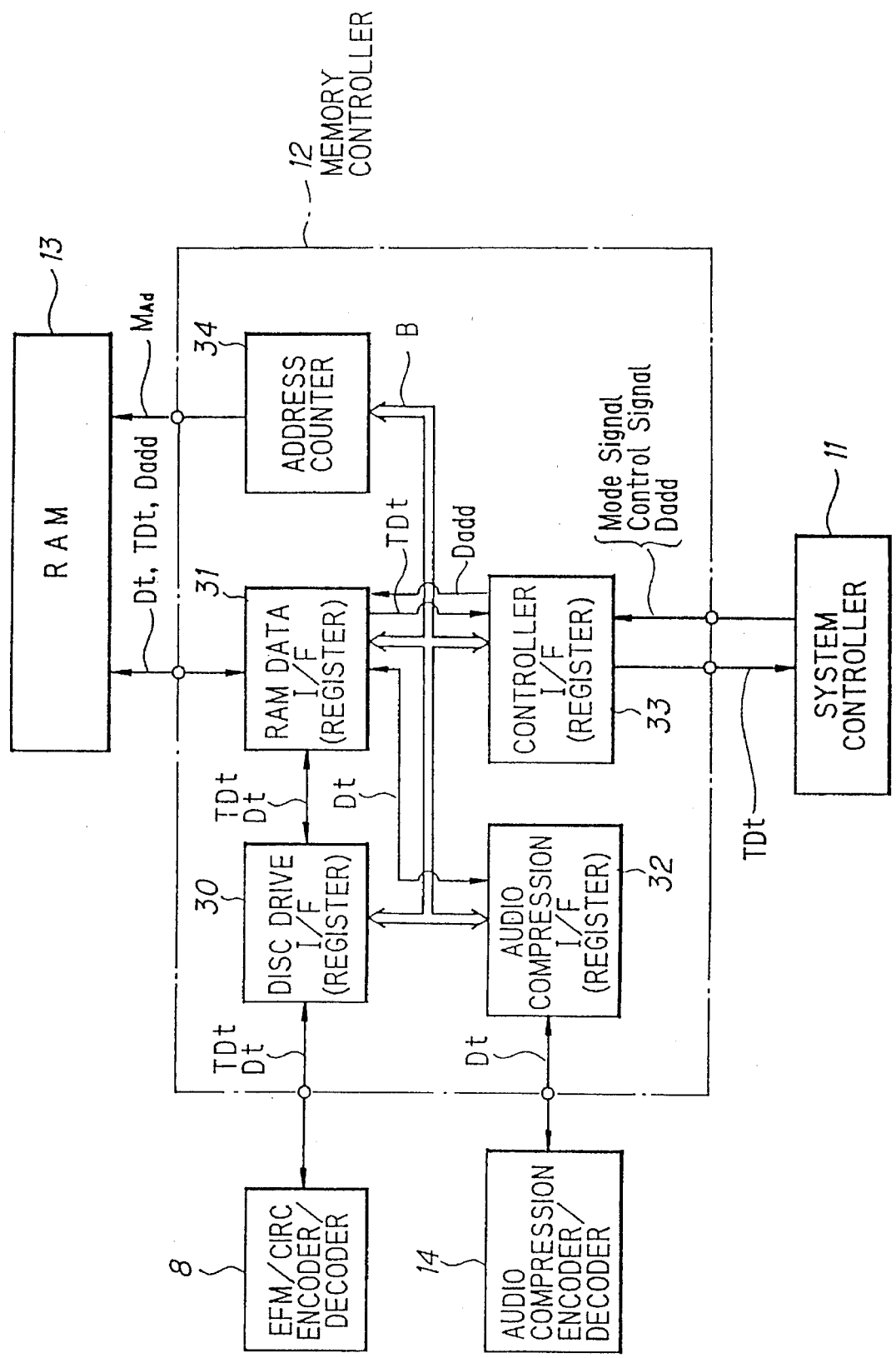
FIG. 10 is a block diagram of a memory control device and a peripheral control circuit of an embodiment according to the present invention.

The construction and the operation of the memory control device (memory controller 12) for use of the buffer RAM 13 in the above mode will now be described. FIG. 10 is a block diagram showing the inner construction of the memory controller 12. A reference numeral 30 represents a disc drive interface unit, and serves to receive and hold record/reproduction data Dt and TOC information TDt for the disc drive side, that is, from the encoder/decoder unit 8.

A reference numeral 31 represents a RAM data interface unit which serves to perform data write-in/read-out operations and hold the data for the buffer RAM 13. The data to be subjected to the write-in/read-out operations are the record/reproduction data Dt and the TOC information TDt.

A reference numeral 32 represents an audio compression interface unit which serves to receive and hold the record/reproduction data Dt for the audio compression unit, that is, the encoder/decoder unit 14.

A reference numeral 33 represents a controller interface unit which serves as an interface for the system controller 11. The system controller 11 accepts TOC information TDt from the controller interface unit 33 and generates the additive data Dadd based on the TOC information TDt. The controller interface unit 33 receives an additive data Dadd, a mode information signal, and a control signal from the system controller 11. The controller interface unit 33 carries out transmission of the additive data Dadd to the RAM data interface 31.

A reference numeral 34 represents an address counter, and it serves to generate a write-in address/read-out address (MAd) through an operation as described later on the basis of address indicating data which are supplied through the controller interface unit 33, the mode information signal, sync data of a sector detected by the disc drive interface unit 30 or by the audio compression interface unit 32, a byte counter signal CT supplied from the RAM data interface unit 31, etc. The address counter 34 outputs the generated address to the buffer RAM 13.

"B" represents a control bus connected to each unit.

Figure 11:
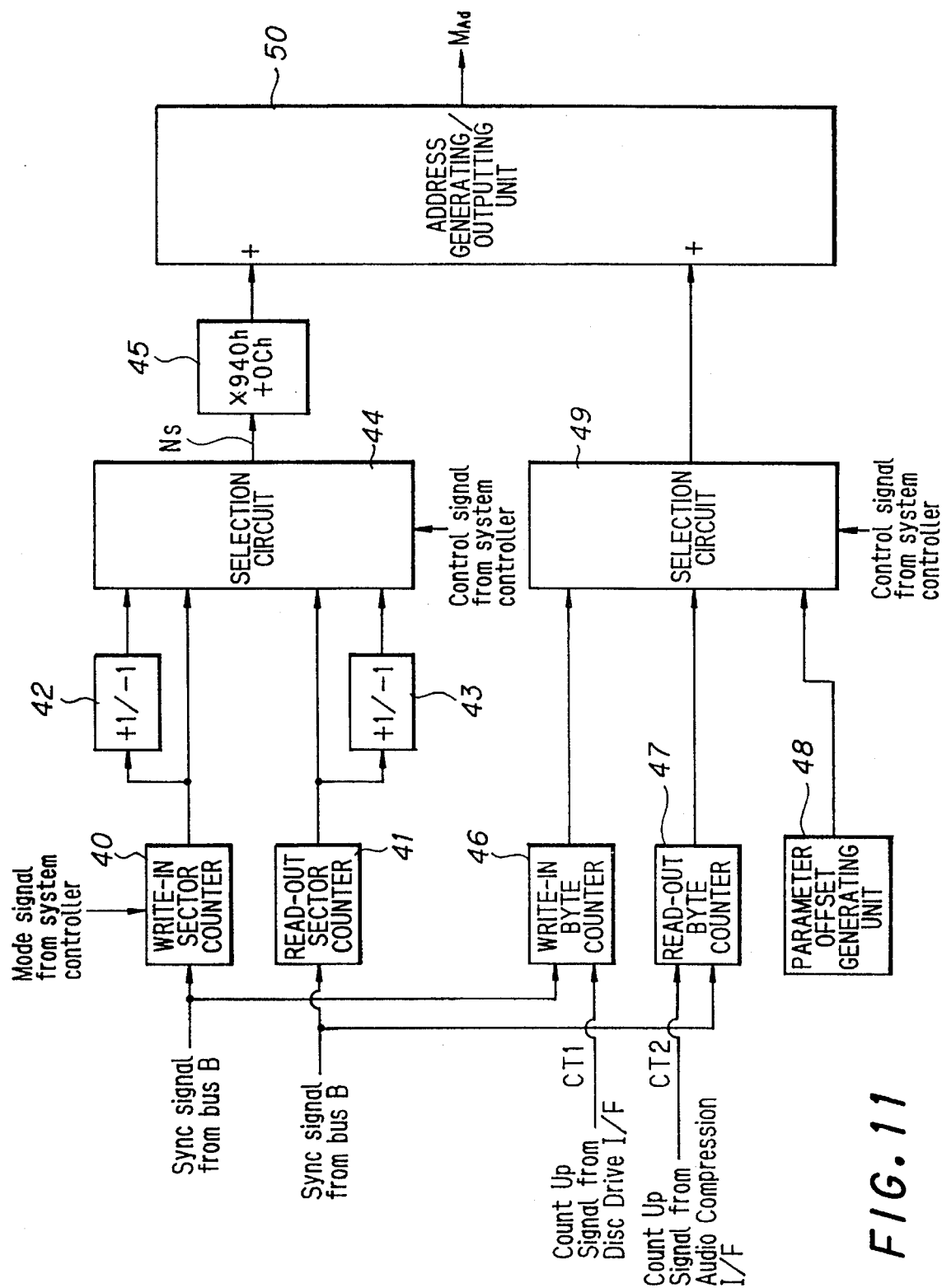
FIG. 11 is a block diagram of an address generating circuit and a peripheral circuit unit of an embodiment according to the present invention.

The construction of the address counter 34 is shown in FIG. 11. A reference numeral 40 represents a write-in sector counter for carrying out a count operation on the basis of the sector sync to obtain an address for a data write-in operation into the buffer RAM 13. In the case of the reproducing, the sector sync is supplied from disc drive interface 30 through the control bus B. On the other hand, in the case of the recording, the sector sync is supplied from audio compression interface 32 through the control bus B.

A reference numeral 41 represents a read-out sector counter for carrying out a count operation on the basis of the sector sync to obtain an address for a data read-out operation from the buffer RAM 13. In the case of the reproducing, the sector sync is supplied from audio compression interface 32 through the control bus B. On the other hand, in the case of the recording, the sector sync is supplied from disc drive interface 30 through the control bus B. When the sector data read out of the disc is written into the buffer RAM 13, a write-in operation mode is selected to be a round mode, an advance mode or a retry mode. The count operation of the write-in sector counter 40 is controlled in accordance with the selected mode signal supplied from system controller 11.

A reference numeral 42 represents an addition/subtraction circuit capable of incrementing or decrementing the count value by 1 of the write-in sector counter 40 by "1", and a reference numeral 43 represents an addition/subtraction circuit capable of incrementing or decrementing the count value of the read-out sector counter 41.

A reference numeral 44 represents a selection circuit, and it selects one of the count values from the write-in sector counter 40, the read-out sector counter 41 and the addition/subtraction circuits 42 and 43. The selection circuit 44 outputs the selected value. The selecting operation is carried out in accordance with a control signal supplied from the system controller 11 through the controller interface unit 33, for example.

A reference numeral 45 represents a sector address calculation unit, and it conducts a calculation of Ns×940h+0Ch on the sector count value Ns output from the selection circuit 44. That is, the head addresses of the areas 00 to DC (sector-based (sector-unit) head addresses in the buffer RAM 13) as described in connection with FIG. 8 are calculated.

A reference numeral 46 represents a write-in byte counter which is reset on the basis of the sector sync to obtain a byte address (a certain order of byte) for the data write-in operation to the buffer RAM 13. The write-in byte counter 46 carries out the count operation on the basis of a byte count up signal CT1 from the audio compression interface unit 31. A reference numeral 47 represents a read-out byte counter which is reset on the basis of the sector sync to obtain a byte address (a certain order of byte) for the data read-out operation from the buffer RAM 13 and carries out its count operation on the basis of the byte count up signal CT2 from the audio compression interface unit 31.

A reference numeral 48 represents a parameter offset generating unit for generating a prescribed parameter offset in order to access the 16-byte additive areas (00add to DCadd) which are provided in each area (area 00 to area DC) in the buffer RAM 13 as described above. The parameter offset generating unit 48 is so designed as to generate "930h" to "93Fh" as parameter offsets in order to access the additive areas, such as the additive area shown in FIG. 9.

A reference numeral 49 represents a selection circuit which selectively outputs one of the outputs of the write-in byte counter 46, the read-out byte counter 47 and the parameter offset generating unit 48 in accordance with a control signal from system controller 11.

A reference numeral 50 represents an address generating/outputting unit which adds the sector address output from the sector address calculation unit 45 to the byte address output from the selection circuit 49 to calculate an access address. The address generating/outputting unit 50 outputs the calculated access address MAd to the buffer RAM 13.

The address counter 34 is designed as described above. Data is transferred to or from the buffer RAM in each of the following situations: (1) during reproduction, data to be reproduced from the recording medium is written to the buffer RAM, (2) during reproduction, data is read out from the buffer RAM for reproduction, (3) during recording, data to be recorded is written to the buffer RAM, and (4) during recording data is read out from the buffer RAM to be recorded on the recording medium. In each of these cases, the access address of an additive area can be obtained using the values of the sector counters 40 and 41 for generating the sector address and the output of the parameter offset generating unit 48. This facilitates the write-in/read-out of the additive data. Various examples for different access modes of the additive area will be described below.

First, an operation of recording the additive data when the data read out from the disc is written into the buffer RAM will be described. Preliminary to this description, the mode control for writing into RAM 13 data which is reproduced from the disc will be briefly described with reference to FIG. 12.

As described above, when the sector data read out from the disc is written into the buffer RAM, any one of a group comprising round mode, advance mode or retry mode is selected for the write-in operation. This selection is a mode control to write a target sector in a predetermined area (any one of area 08 to area DC), and the round mode is first selected at the time when the write-in is carried out. In the round mode, the write-in sector counter 40 holds the current count value even when the sector sync is input.

Accordingly, when the address indication is made from the area 08 in the round mode, the sector address to be calculated in the sector address calculation unit 45 is set to 4A0Ch at all times, and the write-in access is executed in the area 08 on the basis of the count value of the write-in byte counter 46. Thereafter, the sector sync is intercepted, and the data of the sector is written into each byte. Then it is determined whether the newly written sector is the target sector. If it is not the target sector, in accordance with the round mode, the data of the sector which is input in accordance with the interception of the sector sync is written into each byte again in the area 08. That is, the over-writing operation is repeated until the target sector is written.

For example, when the target sector is written in the area 08, the mode is then switched to the advance mode. In the advance mode, the write-in sector counter 40 counts up in accordance with the sector sync. Accordingly, the access address will then indicate the area 09 in accordance with the sector sync of the next sector. Subsequent to the sector sync, the sector data is written in each byte of the area 09. If no write-in error occurs, the sector data are successively written into each area in the advance mode until completion of the writing in one possible reason for ending the write-in operation is data accumulation as described above.

However, when the mode is switched to the advance mode and when the area for writing data is shifted in accordance with the advance mode, the presence or absence of a write-in error on the previously written sector is determined. If any error exists, the write-in operation is carried out in the retry mode. For example, if any write-in error in the area 09 is detected at the time when the processing enters the area 0A, the mode is switched to the retry mode to decrement the count value of the write-in sector counter by "1". That is, the access address is set back to an address in the area 09. Subsequently, the write-in operation is continued in the area 09 in accordance with the sector sync in under the mode control state of round mode. If the target sector is written, the mode control is returned to the advance mode.

In the case where the sector data is written in as described above, the address is generated as follows for writing the additive data corresponding to the sector to the additive area.

Figure 12:
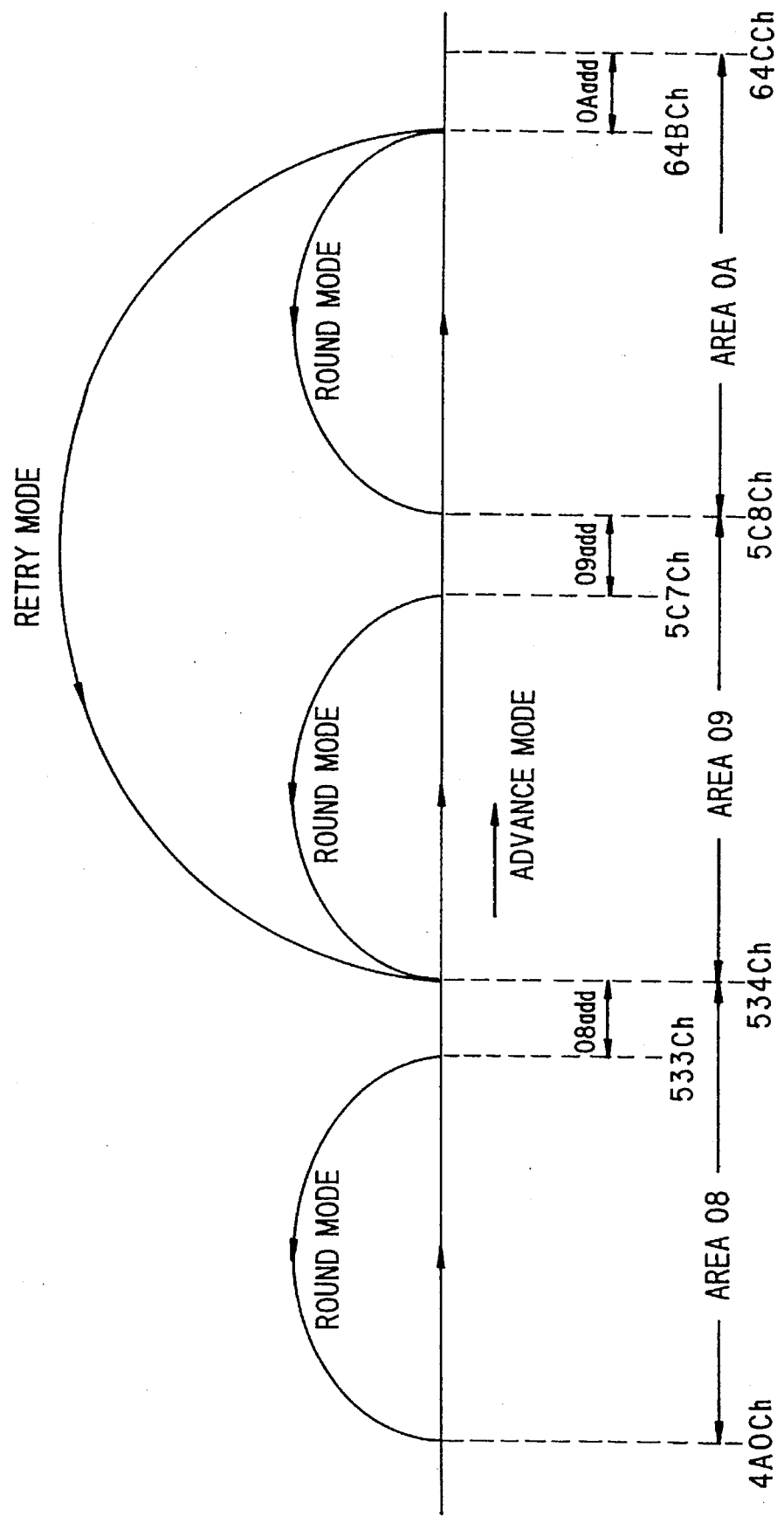
FIG. 12 is a schematic view of a write-in operation to a buffer RAM.

For example, in the case of FIG. 12, when the target sector data has been already written in the area 08, the advance mode is set and the write-in operation into the area 09 is ready to be carried out. The additive data for the written-in sector can be preferably written in the additive area 08add of the area 08. That is, it becomes necessary to obtain the access address of the additive area 08add.

Therefore, the count value of the write-in sector counter 40 is set to a value indicating the area 09, but the count value is decremented by "1" in the addition/subtraction circuit 42. In order to accomplish this, the selection circuit 44 selectively outputs the output of the addition/subtraction circuit 42 to thereby obtain the sector address for the area 08. At the same time, the parameter offset corresponding to the byte to be written in the additive area is output from the parameter offset generating unit 48 through the selection circuit 49. For example, when the additive data is required to be written as a parameter PRM20 at a 938h-th byte in the sector shown in FIG. 9, the parameter offset "938h" is generated. Through this operation, the parameter offset 938h is added to the sector address 4A0Ch of the area 08 in the address generating/outputting unit 50 to generate and output an address indicating the position of the parameter PRM20.

Further, when in the round mode, the additive data is required to be written in correspondence with the sector to be written into the area. Therefore parameter offset is directly output from the parameter offset generating unit 48, and this is selectively output from the selection circuit 49. In this way the access address of the prescribed byte within the additive area 09add in the area 09 is generated.

Next, the operation occurring when the sector data is read out from the buffer RAM 13 and transmitted as reproducing data will be described. Normally, the areas 08, 09, 0A, ... are successively read out in order. In this case, when the sector data for the area 09 is read out and transmitted, it is preferable that the additive data for a next sector (i.e., the sector which is stored in the area 0A) is read out. In order to accomplish this, the value which is obtained by incrementing the count value of the read-out sector counter 41 by "1" in the addition/subtraction circuit 43 is selectively output from the selection circuit 44. At the same time, a prescribed parameter offset is output from the parameter offset generating unit 48. The selection circuit 49 selectively outputs the prescribed parameter offset.

By this operation, the address 5C8Ch indicating the area 0A is obtained as the sector address from the sector address calculation unit 45, and this is added to the parameter offset value, so that the address of a byte in the additive area 0Aadd of the area 0A is obtained. Accordingly, a desired additive data can be read out on the basis of the above address.

For various cases occurring in the reproducing operation, the calculation processing of the address will be collectively described where the parameter PRM00 of a first byte in the additive area is accessed. The write-in sector counter value, the read-out sector counter value and the generated address at each time point are represented by WSC, RSC and MAd. Further, the increment or decrement processing of WSC or RSC by "1" is carried out in the addition/subtraction circuits 42 or 43 respectively, and the sector counters are obtained through the selection of the output of the addition/subtraction circuit 42 or 43 by the selection circuit 44. The calculation of (×940h+0Ch) represents the processing in the sector address calculation unit 45 as described above. The parameter PRM00 is located at the byte corresponding to the offset position of 930h within the sector See FIG. 9.

1) For an address generating mode for writing additive data as parameter PRM00 when sector data read out from the disc is recorded in the buffer RAM:

a. In a case where during the write-in operation of an area in the advance mode or round mode, the additive data (PRM00) for a sector in an area previous to the area is to be written:

$$MAD=(WSC-1)\times 940h+0Ch+930h$$

b. In a case where during the write-in operation of an area in the advance mode or round mode, the additive data (PRM00) for a sector in that area is to be written:

$$MAd=WSC\times 940h+0Ch+930h$$

c. In a case where during the write-in operation of an area in the advance mode or round mode, the additive data (PRM00) for a sector is to be written into a subsequent area:

$$MAd=(WSC+1)\times 940h+0Ch+930h$$

613

2) For an address generating mode for reading out additive data stored as parameter PRM00 when sector data is read out from the buffer RAM and output as reproducing data:

a. In a case where the additive data (PRM00) is for a sector in an area subsequent to the area being read out:

$$MAd=(RSC+1)\times 940h+0Ch+930h$$

b. In a case where the additive data (PRM00) is for a sector data of an area being read out:

$$MAd=RSC\times 940h+0Ch+930h$$

c. In a case where the additive data (PRM00) for is a sector data of an area previous to an area being read out:

$$MAd=(RSC=1)\times 940h+0Ch+930h$$

In order to obtain the access address for the parameters PRM01 to PRM33, the additive term of "930h", that is the parameter offset, may be successively set to "931h" to "93Fh".

Further, the selection of one of the above modes a, b and c in the write-in operation and the read-out operation to generate the address is dependent on the output selection control of the selection circuits 44 and 49 by the system controller 11.

In the recording operation of the recording and reproducing apparatus, the access address for the additive area can be also obtained through the same processing in the address counter 34.

The address counter 34 is constructed as described above. Accordingly, when additive data is accessed, the system controller 11 is not required to calculate the address corresponding to the additive data. Therefore, by having the system controller 11 carry out only the parameter offset indication, the access byte position for a sector can be automatically set in the additive area. Further, the additive area for three sectors can be accessed by the address generating circuitry because the sector counter or the value obtained by incrementing or decrementing the sector by "1" can be used in the address calculation.

Further, by obtaining the access address for the additive area with the sector counter value, the additive information can be held in the same area as its associated sector in the buffer RAM 13. In the read-out operation the additive data corresponding to the sector can be read out in accordance with the read-out operation even when the system controller 11 does not manage the relationship between the sector written in the buffer RAM 13 and the additive data of the sector.

If the read-out and write-in of the additive data are always to be carried out for the current sector, the addition/subtraction circuits 42, 43 are not required.

The above embodiment relates to the case where the memory control device and the address generating circuit are applied to the recording and reproducing apparatus for the magneto-optical disc 1, however, they are also applicable to apparatus used exclusively for reproduction, apparatus used exclusively for recording, and other equipment.

Further, the construction of the memory control device or the address counter is not limited to that of the above described embodiment. Various changes and modifications could be effected by persons skilled in the art without departing from the spirit or scope of the invention as defined in the appended claims.

What is claimed is:

1. A memory control device for use in a recording and/or reproducing apparatus having memory means for storing data, including additive data, on a sector basis which is to be transmitted to or from a recording medium, the memory control device comprising:

a means for receiving and transmitting a sector sync signal and a byte count signal;

first write-in counting means for counting a sector number on the basis of the sector sync signal to be used in obtaining an address for a data write-in operation into the memory means;

first read-out counting means for counting a sector number on the basis of the sector sync signal to be used for obtaining an address for a data read-out operation from the memory means;

first selecting means for selecting a count value Ns from among the sector numbers received from the first write-in counting means and the first read-out counting means;

calculating means for calculating a sector address in accordance with said count value Ns according to a predetermined calculation;

second write-in counting means for counting a byte value on the basis of the sector sync signal and the byte count signal to be used for obtaining a byte address for a data write-in operation into the memory memos;

second read-out counting means for counting a byte value on the basis of the sector sync signal and the byte count signal to be used in obtaining a byte address for a data read-out operation from the memory means;

offset byte generating means for generating a byte value which has an offset corresponding to the byte address of the additive data within a data sector;

second selecting means for selecting one of byte values from among byte values received from the second write-in counting means, second read-out counting means, and offset byte generating means; and an address generating/outputting means for adding the sector address output from the calculating means with the selected byte value output from the second selecting means to calculate an access address, and for outputting the calculated access address to the memory means.

2. The memory control device according to claim 1, wherein the additive data is associated with a sector and is based on the other data of that sector.

3. The memory control device according to claim 1, wherein said additional data comprises one of the following: track number, track change information, identification code of stereo/monaural, emphasis information, information of inhibit/permit copy-write, error information, and running time.

4. The memory control device according to claim 1, wherein the predetermined calculation of the sector address, as expressed in hexidecimal notation, conducted in the calculating means is Ns×940h+0Ch.

5. The memory control device according to claim 1 further comprising:

first addition/subtraction means for incrementing and decrementing the count value of the first read-out counting means;

second addition/subtraction means for incrementing and decrementing the count value of the first write-in counting means.

6. The memory control device according to claim 5, wherein the first selecting means selects the count value Ns from among sector numbers received from the first write-in counting means, the first read-out counting means, the first addition/subtraction means, and the second addition/subtraction means.

7. The memory control device according to claim 6, wherein sector number which is counted in the said first write-in counting means changes in accordance with a received mode signal.

8. The memory control device according to claim 7, wherein the mode signal indicates one of three possible modes:

a round mode in which sector number does not change with the sync signal;

a advance mode in which the sector number increases with the sync signal; and a re-try mode in which the sector number is decreased to correspond to a previous sector.

9. The memory control device according to claim 8, wherein during the write-in operation of an area in the advance mode or the round mode, the additive data is written to an address in the memory means given by the hexidecimal notation expression:

$$(WSC-1) \times 940h + 0Ch + 930h$$

wherein WSC is the sector number of the first write-in counting means.

10. The memory control device according to claim 8, wherein during the write-in operation of an area in the advance mode or the round mode, the additive data is written to an address in the memory means given by the hexidecimal notation expression:

$$WSC \times 940h + 0Ch + 930h$$

wherein WSC is the sector number of the first write-in counting means.

11. The memory control device according to claim 8, wherein during the write-in operation of an area in the advance mode or the round mode, the additive data is written to an address in the memory means given by the expression:

$$(WSC+1) \times 940h + 0Ch + 930h$$

wherein WSC is the sector number of the first write-in counting means.

12. The memory control device according to claim 4, where the additive data is read from an address in the memory means given by the hexidecimal notation expression:

$$(RSC+1) \times 940h + 0Ch + 930h$$

wherein RSC is the sector number of the first read-out counting means.

13. The memory control device according to claim 4, wherein the additive data is read out from an address in the memory means given by the hexidecimal notation expression:

$$RSC \times 940h + 0Ch + 930h$$

wherein RSC is the sector number of the first read-out counting means.

14. The memory control device according to claim 4, wherein the additive data is read out from an address in the memory means given by the following hexidecimal notation expression:

$$(RSC-1) \times 940h + 0Ch + 930h$$

wherein RSC is the sector number of the first read-out counting means.

* * * * *

UNITED STATES PATENT AND TRADEMARK OFFICE
CERTIFICATE OF CORRECTION

PATENT NO. : 5,553,048
DATED : September 3, 1996
INVENTOR(S) : YASUAKI MAEDA

It is certified that error appears in the above-indentified patent and that said Letters Patent is hereby corrected as shown below:

In Col. 15, line 65, please change "Mad=(RSC=1)X940h+0Ch+930h" to --Mad=(RSC-1)X940h+0Ch+930h--;

In Col. 17, line 4, please change "memos" to --means--.

Signed and Sealed this

Twenty-fourth Day of December, 1996

Attest:

BRUCE LEHMAN

Attesting Officer  Commissioner of Patents and Trademarks